(12) United States Patent
Dienhart et al.

(10) Patent No.: US 6,298,687 B1
(45) Date of Patent: Oct. 9, 2001

(54) INTEGRATED COLLECTOR AND HEAT TRANSFER STRUCTURE UNIT

(75) Inventors: Bernd Dienhart, Cologne; Hans-Joachim Krauss, Stuttgart; Hagen Mittelstrass, Bondorf; Karl-Heinz Staffa; Christoph Walter, both of Stuttgart, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/496,215

(22) Filed: Feb. 1, 2000

(30) Foreign Application Priority Data

Feb. 1, 1999 (DE) .............................. 199 03 833

(51) Int. Cl.7 .................................................. F25B 41/00
(52) U.S. Cl. ............................... 62/513; 62/471
(58) Field of Search ............................. 62/471, 503, 513

(56) References Cited

U.S. PATENT DOCUMENTS

| | | | |
|---|---|---|---|
| 1,254,519 | * 1/1918 | McClellan | 62/513 |
| 2,121,253 | * 1/1938 | McGuffey | 62/503 |
| 3,131,553 | * 5/1964 | Ross | 62/503 |
| 3,765,193 | * 10/1973 | Root | 62/503 |
| 3,955,375 | 5/1976 | Schumacher. | |
| 4,217,765 | * 8/1980 | Ecker | 62/513 |
| 4,895,203 | 1/1990 | McLaren. | |
| 5,396,776 | * 3/1995 | Kim | 62/503 |

* cited by examiner

Primary Examiner—William E. Tapolcai
Assistant Examiner—Mohammad M. Ali
(74) Attorney, Agent, or Firm—Crowell & Moring LLP

(57) ABSTRACT

An integrated modular collector—heat exchanger unit for motor vehicle air conditioners and the like has a collector housing in which a collecting space and a heat exchanger unit are disposed. The heat exchanger unit includes two separate heat exchanger ducts which are in a thermal contact. One heat exchanger duct has a helical course and is part of a first flow duct which extends from a housing inlet to a housing outlet in the collector housing. The other heat exchanger duct is part of a second flow duct extending between the collecting space and a housing connection. This other heat exchanger duct also has a helical course, its coils in each case being in a thermal contact with at least one adjoining coil of the first of the first heat exchanger duct.

25 Claims, 5 Drawing Sheets

INTEGRATED COLLECTOR AND HEAT TRANSFER STRUCTURE UNIT

BACKGROUND OF THE INVENTION

This application claims priority of DE 199 03 833.3, filed Feb. 1, 1999, in Germany, the disclosure of which is expressly incorporated by reference herein.

The invention relates to an integrated modular collector—heat exchanger unit particularly for a motor vehicle air conditioner, having a collector housing in which a collecting space and a heat exchanger unit with first and second separate heat exchanger ducts in thermal contact with one another, are situated, the first heat exchanger duct having a helical course and being part of a first flow duct which extends from a housing inlet to a housing outlet in the collector housing, and the second heat exchanger duct being part of a second flow duct which extends between the collecting space and a housing connection. Modular units of this type can be used particularly in air conditioners of motor vehicles, such as $CO_2$ air conditioners, in order to provide in each case a collector and an internal heat exchanger of the refrigerant circulating system in an integrated arrangement.

An integrated modular collector—heat exchanger unit of this type is disclosed in U.S. Pat. No. 3,955,375. The modular unit illustrated there is part of an air conditioner, the collector part of the modular unit being situated between the outlet side of an evaporator and the inlet side of a compressor, and its heat exchanger unit forming an internal heat exchanger between the low-pressure-side refrigerant situated in the collecting space, on the one hand, and the high-pressure-side refrigerant in front of the evaporator inlet side, on the other hand. By way of a lateral inlet in the upper collecting space area, the refrigerant arrives in the collecting space and is sucked out of the latter by way of a top-side collecting space opening. Simultaneously, oil, which has settled in the lower collecting space area, is also sucked out by way of an oil suction tube which extends from there upward out of the collecting space. The integrated modular heat exchanger unit is formed by a coiled tubing arranged in the collector housing and thus in the collecting space, both tube ends on the housing underside extending out of the collecting space and leading there into a laterally provided connection opening of a connection block.

In the case of a modular collector—heat exchanger unit disclosed in German Published Patent Application DE 196 35 454 A1, corresponding to commonly assigned U.S. Patent application Ser. No. 08/915,760, filed Aug. 21, 1997, the heat exchanger unit is formed by one or several flat-tube spirals with mutually spaced turns, the flat tube interior forming a first heat exchanger duct of the heat exchanger unit and the space between the tube spirals forming a second heat exchanger duct of the heat exchanger unit which is in a thermal contact therewith.

From U.S. Pat. No. 4,895,203, a two-fluid heat exchanger is known which is used particularly for the heating of water for industrial use by a coolant of a motor vehicle, which two-fluid heat exchanger has a cylindrical outer housing, a hollow cylinder coaxially arranged in its interior and a fluid-tight coiled tubing which extends between the hollow cylinder and the outer housing and has turns spaced from one another in the axial direction. The coiled tubing forms the heat exchanger duct for the one fluid, while the space between the coil turns acts as a helical heat exchanger duct for the other fluid.

The invention is based on the technical problem of providing an integrated modular collector—heat exchanger unit of the initially mentioned type which has a comparatively simple construction, can be produced at relatively low expenditures and implements a compact integration of the heat exchanger unit in a collector housing with a good heat exchange efficiency.

The invention solves this problem by providing an integrated modular collector—heat exchanger unit, wherein the second heat exchanger duct has a helical course and its coils are in a thermal contact with at least one adjoining coil respectively of the first heat exchanger duct. In the case of this modular unit, characteristically both heat exchanger ducts of the heat exchanger unit have a helical course such that the turns of one duct are in each case in a thermal contact with at least one adjacent turn of the other duct. As a result, the heat exchange media, which separately from one another flow through the two heat exchanger ducts, are in a heat exchange connection with one another along the whole wound duct length. Since, as the result of the coiling, this flow duct length may clearly be larger than the outer dimensions of the heat exchanger unit, the heat exchanger unit with the given required heat exchange capacity can be housed comparatively compactly in the collector housing. Simultaneously, the construction of the heat exchanger unit of two helical heat exchanger ducts, which are in a thermal contact, is relatively simple and can be produced at low expenditures. In particular, it is possible in this case to construct the integrated modular collector—heat exchanger unit as a whole as a pure welded construction without requiring additional soldered connections.

In the case of a modular unit further developed according to preferred embodiments of the invention, the collecting space is formed by a collecting space arranged in the interior of the collector housing, and the heat exchanger unit is implemented in a very simple manner by a coiled tubing which is inserted with axially spaced coils in a sealing manner radially between the interior wall of the collector housing and the exterior wall of the collector housing. While the tube interior of this coiled tubing forms the one heat exchanger duct, the space between the spaced coils of the coiled tubing acts as the other heat exchanger duct. The thus constructed modular collector—heat exchanger unit can be manufactured by means of a few simple components.

In a further development of preferred embodiments of the invention, the collecting tank is open on top, and the pertaining flow duct, which leads from the collecting tank to the exterior housing side, extends from the collecting tank area, which is open on top, by way of the corresponding coiled heat exchanger duct, downward to at least the lower collecting tank area, where it is connected with one or several oil suction bores provided in the collecting tank. In this case, an "oil suction bore" is any fine opening through which a fluid, which is carried along by the actual heat exchanger medium and is clearly more viscous than the latter, is entrained, which fluid may be but does not have to be oil. When used in air conditioners, it is usually lubricating oil for the compressor entrained by the refrigerant. By way of the oil suction bores, this lubricating oil can be entrained again in a controlled manner by the refrigerant sucked from the collecting tank, after it has previously settled on the bottom in the collecting tank.

In a further development according to preferred embodiments of the invention, an increase of the heat exchange capacity is provided in that the exterior wall of the collecting tank has a profiling adapted to the coiled heat exchanger tubing, which results in a heat-exchange-increasing, flat and not only line-shaped contact of the coiled tubing on the exterior wall of the collecting tank. In a further development which also increases the heat exchange, the coiled heat exchanger tubing is provided with an exterior-side surface-enlarging profiling.

In the case of a modular unit further developed according to preferred embodiments of the invention, the heat exchanger unit is formed by a coiled coaxial tubing, in the case of which a radially interior and a radially exterior duct represent the two heat exchanger ducts. This modular unit can also be manufactured in a simple manner and with a few components. In particular, in this case, the collector housing may simultaneously form the boundary of the collecting space, in which the coiled coaxial tubing will then be situated.

In the case of a modular unit further developed according to preferred embodiments of the invention, the two housing-side connection points of the continuous first flow duct, which does not end in the collecting space, are situated on a common housing side, which preferably faces an end area of the coiled heat exchanger ducts, and the flow duct extends by means of a straight tube section in the collector housing to the opposite heat exchanger duct end area. Analogously, as required, the housing-side inlet and outlet for the heat exchange medium to be intermediately stored in the collecting space may also be provided on this housing side so that all connections for the integrated modular collecting—heat exchanger unit are accessible from one side.

In the case of a modular unit further developed according to preferred embodiments of the invention, the coaxial coiled tubing changes in one end area into a U-shaped coaxial tube section which is situated radially within the coil area and by means of which the heat-exchange-effective flow length can be further increased without any enlargement of the modular unit itself.

In a further development of the invention according to preferred embodiments according to the invention, the coaxial coiled tubing is arranged in the collecting space and at one end with its radially exterior duct is shortened such that its mouth end is situated in the upper collecting space area, while the radially interior duct is continued to the exterior side of the housing. In a further development of this measure, the coaxial coiled tubing is provided in a lower collecting space area with one or several oil suction bores which connect its radially exterior duct with the lower collecting space area, in which the more viscous fluid settles which is entrained by the actual heat exchange medium.

In the case of a modular unit further developed according to preferred embodiments of the invention, collecting space feeding devices are provided which feed the heat exchange medium to be intermediately stored in the collecting space to this collecting space by means of a tangential flow component. The resulting rotating inflow current into the collecting space facilitates the desired separation of the actual heat exchange medium and the more viscous fluid entrained by it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

DETAILED DESCRIPTION OF THE DRAWINGS

Figure 1:
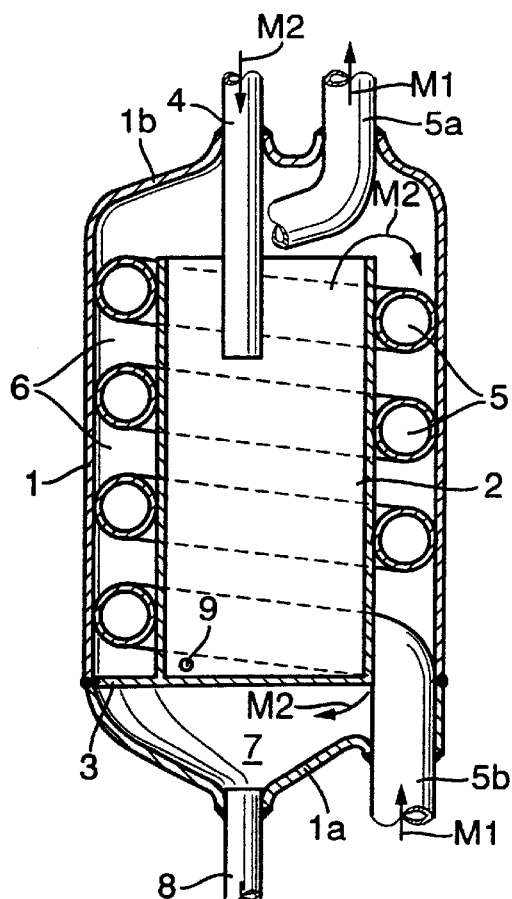
FIG. 1 is a longitudinal sectional view of an integrated modular collector—heat exchanger unit having a collecting space tank disposed on a plane intermediate bottom and a surrounding coiled heat exchange tubing, constructed according to a preferred embodiment of the present invention.

The modular collector—heat exchanger unit illustrated in FIG. 1 has a cylindrical collecting tank 2 in the interior of a collector housing 1, which collecting tank 2 operates as a collecting space and is disposed on an intermediate bottom 3. Between the collecting tank 2 and the collector housing 1, a coiled tubing 5 is inserted whose coils are spaced from one another in the axial direction and rest radially on the inside in a fluid-tight manner against the exterior wall of the collecting tank and rest radially on the outside in a fluid-tight manner against the interior wall of the collector housing. In this manner, a corresponding helical space 6 is formed which is axially bounded by two adjacent tubing coils respectively, is radially bounded toward the interior by the collecting tank wall and is radially bounded toward the exterior by the collector housing wall.

The coiled tubing 5 ends on the upper housing side with an outlet connection piece 5a which extends out of the housing 1 and ends on the lower housing side with an inlet connection piece 5b which extends through the intermediate bottom 3 and a bottom wall 1a of the collector housing 1. While the inlet connection piece 5b leads in a fluid-tight manner through the bottom wall 1a of the housing, a passage, which is not shown in detail and which is larger than the inlet connection piece 5b is provided in the intermediate bottom 3, by way of which passage the helical space 6 is in a fluidic connection with a withdrawal space 7 bounded by the intermediate bottom 3 and the bottom wall 1a of the housing. From the withdrawal space 7, an outlet connection piece 8 leads out of the collector housing 1. By way of another opening on the top side 1b of the housing, an inlet connection piece 4 is inserted which leads into the collecting tank 2 which is open on top.

In this manner, the tube 5, which is coiled in the collecting tank area, on the one hand, and the space between the coils 6 together with the upper collecting tank outlet and the withdrawal space 7, on the other hand, form a first and a second flow duct. Along their helical sections, that is, along the coiled tubing 5 and the space between the coils 6, the two flow ducts are in a thermal contact with one another and thus form a first and a second heat exchanger duct of a heat exchanger unit integrated in the collector housing 1.

In the operation, a first heat exchange medium M1 is guided through the tube flow duct extending continuously from the inlet connection piece 5b to the outlet connection piece 5a in the collector housing 1, which tube flow duct consists of the coiled tubing 5 in the heat-exchange-active area. A second heat exchange medium M2, which is to be brought into a thermal contact with the first heat exchange medium M1, arrives by way of the inlet connection piece 4 in the collecting tank 2 and is intermediately stored there. It can be withdrawn from there in the vapor state on top out of the collecting tank 2, in which case it flows downward along the space 6 between the coils, then arrives in the withdrawal space 7 and is withdrawn from there by way of the outlet connection piece 8. Along the helical flow path formed by the space 6 between the coils, the second heat exchange medium M2 is in a thermal countercurrent contact with the first heat exchange medium M1 guided through the coiled tubing 5 by way of the wall of the coiled tubing 5 manufactured of a highly thermally conductive material.

When a more viscous fluid is entrained by the second heat exchange medium M2 introduced into the collecting tank 2, this more viscous fluid settles on the bottom of the collecting tank 2. In order to be able to entrain it from there by means of the flow of the second heat exchange medium M2 withdrawn from the collector housing 1, one or several oil suction bores 9 are provided in the lower area of the collecting tank side wall, which oil suction bores 9 are dimensioned such that, as a function of the suction effect, the more viscous fluid is sucked to a certain desired extent out of the collecting tank 2.

The thus constructed modular collector—heat exchanger unit can be used particularly for the refrigerant circulation of a motor vehicle air conditioner, in which $CO_2$ or another conventional refrigerant is used. The heat exchanger unit 5, 6 integrated in the collector in this case operates has an internal heat exchanger between the refrigerant flowing on the high-pressure side of the refrigerant circulating system, which refrigerant in this case represents the first heat exchange medium M1, and the refrigerant flowing on the low-pressure side, which in this case represents the second heat exchange medium M2. On the low-pressure side, the collector part of the modular unit with the collecting tank 2 adjoins an evaporator and changes into the internal heat exchanger 5, 6, while, on the high-pressure side, the latter is situated between a condenser or gas cooler and an expansion valve.

As the result, the refrigerant coming from the evaporator arrives by way of the inlet connection piece 4 in the collecting tank 2. Compressor lubricating oil entrained by the entering refrigerant settles on the collecting tank bottom. In the collecting tank 2, the intermediately stored refrigerant is situated in the lower area above the settled oil in the liquid condition and in the upper area in the gaseous state. As the result of the suction effect of the compressor, gaseous refrigerant is withdrawn from above out of the collecting tank 2, flows helically through the space 6 between the coils downward into the withdrawal space 7, again entraining by way of the oil suction bores 9 a certain amount of lubricating oil, and leaves the collector housing 1 by way of the outlet connection piece 8 in the direction of the compressor. In the countercurrent thereto, the high-pressure-side refrigerant coming from the gas cooler or the condenser is introduced by way of the inlet connection piece 5b into the coiled tubing, flows there helically in the coiled tubing in the upward direction in a heat exchange connection with the low-pressure side refrigerant flowing through the space 6 between the coils in the downward direction, and then leaves the collector housing 1 by way of the outlet connection piece 5a.

It is understood that, depending on the application, the first heat exchange medium M1 can also be guided through the pertaining first flow duct in the direction opposite to the illustrated direction, in which case it then flows downward through the coiled tubing 5 in a co-current flow with the second heat exchange medium M2 in the space 6 between the coils; that is, in this case, the integrated heat exchange unit operates according to the co-current flow principle.

Figure 2:
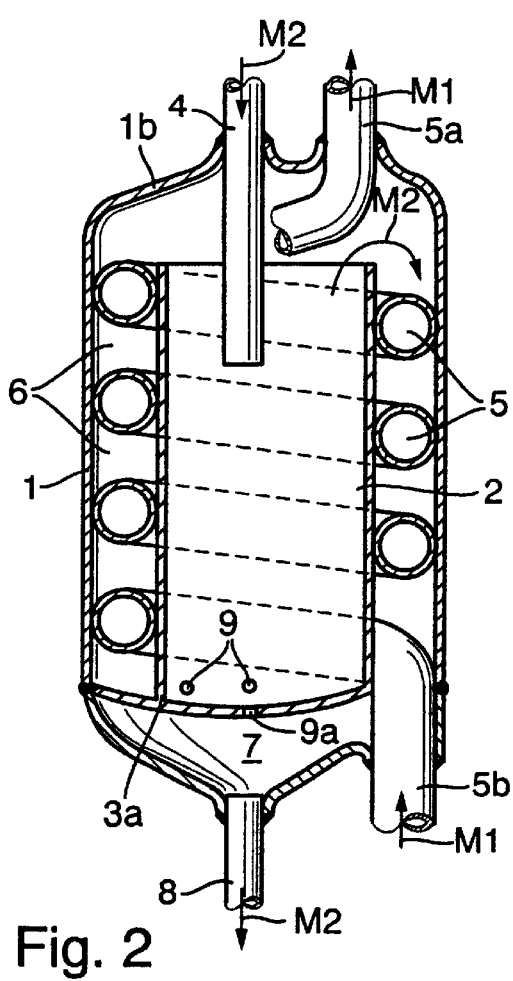
FIG. 2 is a view corresponding to FIG. 1 but for a modular collector—heat exchanger unit with a downward-curved intermediate bottom, constructed according to another preferred embodiment of the present invention.

FIG. 2 shows a variant of the modular unit of FIG. 1 which differs from this modular unit only in the design of the intermediate bottom, in which case no planar intermediate bottom but an intermediate bottom 3a curved downward closes off the collecting tank 2 on the bottom. The same reference numbers as in FIG. 1 are chosen for corresponding elements, so that to this extent reference can be made to the above description concerning FIG. 1. In the embodiment of FIG. 2, instead of or in addition to the lateral oil suction bore or bores 9, an oil suction bore 9a is provided in the intermediate bottom 3a at its lowest point. By way of this oil suction bore 9a, compressor lubricating oil intermediately stored in the lower area of the collecting tank 2 can be sucked off in a defined desired quantity into the withdrawal space 7 and can be entrained there by the refrigerant M2 sucked to the compressor. The downward-curved intermediate bottom design permits by way of the oil suction bore 9a provided at the deepest point an entraining of oil to the compressor already when only little oil has collected in the collecting tank 2.

Figure 3:
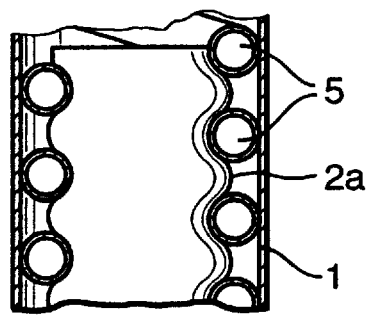
FIG. 3 is a cutout-type sectional view of a modular collector—heat exchanger unit corresponding to FIGS. 1 and 2, but with a profiled collecting tank wall.
Figure 4:
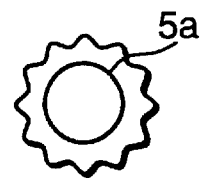
FIG. 4 is a cross-sectional view of a profiled coiled tubing which can be used instead of the unprofiled coiled heat exchanger tubing of FIGS. 1 to 3.

In a cutout-type sectional view, FIG. 3 shows another variant of the modular unit according to FIG. 1 or 2, in which case only the heat-exchange-active modified area is shown, while otherwise the modular unit corresponds to that of FIG. 1 or 2. In the case of the modular unit of FIG. 3, a collecting tank 2a is provided for forming the collecting space, which collecting tank 2a has a side wall which is profiled in conformance with the coiled tubing 5. As a result, the coils of the coiled tubing 5 rest on their radial interior side not only in a line-shaped manner but flatly with substantial surface contact as shown against the outer wall of the collecting tank, which, on the one hand, facilitates the, although not absolutely necessary, nevertheless generally desired fluid-tightness of this connection, and, on the other hand, permits an improved heat exchange between the heat exchange medium intermediately stored in the collecting tank 2a and withdrawn from the latter, on the one hand, and the heat exchange medium guided through the coiled tubing 5, on the other hand. In addition or as an alternative to this profiling of the collecting tank side wall, an exterior-side profiling of the coiled tubing may be provided in order to increase its heat-exchanging surface. FIG. 4 illustrates an example of such a coiled tubing 5a which is profiled on the exterior side in a surface-enlarged manner. The enlarged heat-exchanging surface, in addition, permits a higher flow rate of the heat exchange media without any reduction of the heat exchange capacity.

Figure 5:
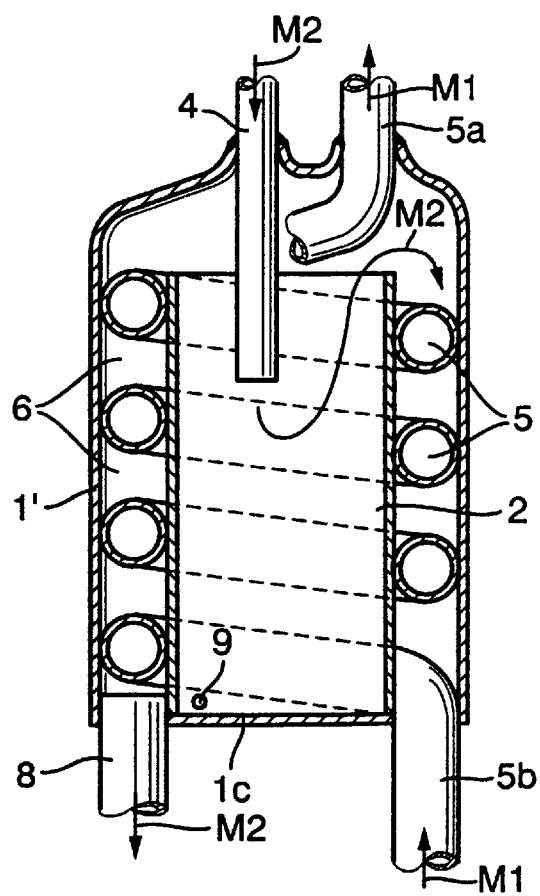
FIG. 5 is a view corresponding to FIG. 1 but for a modular collector—heat exchanger unit without an intermediate bottom, constructed according to another preferred embodiment of the present invention.

FIG. 5 shows another modular collector—heat exchanger unit which is modified with respect to those of FIGS. 1 and 2 in that no intermediate bottom is provided. To the extent that functionally corresponding elements exist, these are provided with the same reference numbers so that with respect to their description reference is made to that of FIG. 1. In this embodiment, the collecting tank 2 is disposed directly on a flat bottom 1c of a collector housing 1' which is modified to this extent. The inlet connection piece 5b for the coiled tubing 5 extends through a first bore in the housing bottom 1c, while the outlet connection piece 8 for the second heat exchange medium M2 is inserted into a second bore of the bottom 1c and leads into the lower end area of the space 6 between the coils, with which, in addition, the one or several oil suction bore(s) 9 made in the collecting tank side wall are connected.

Figure 6:
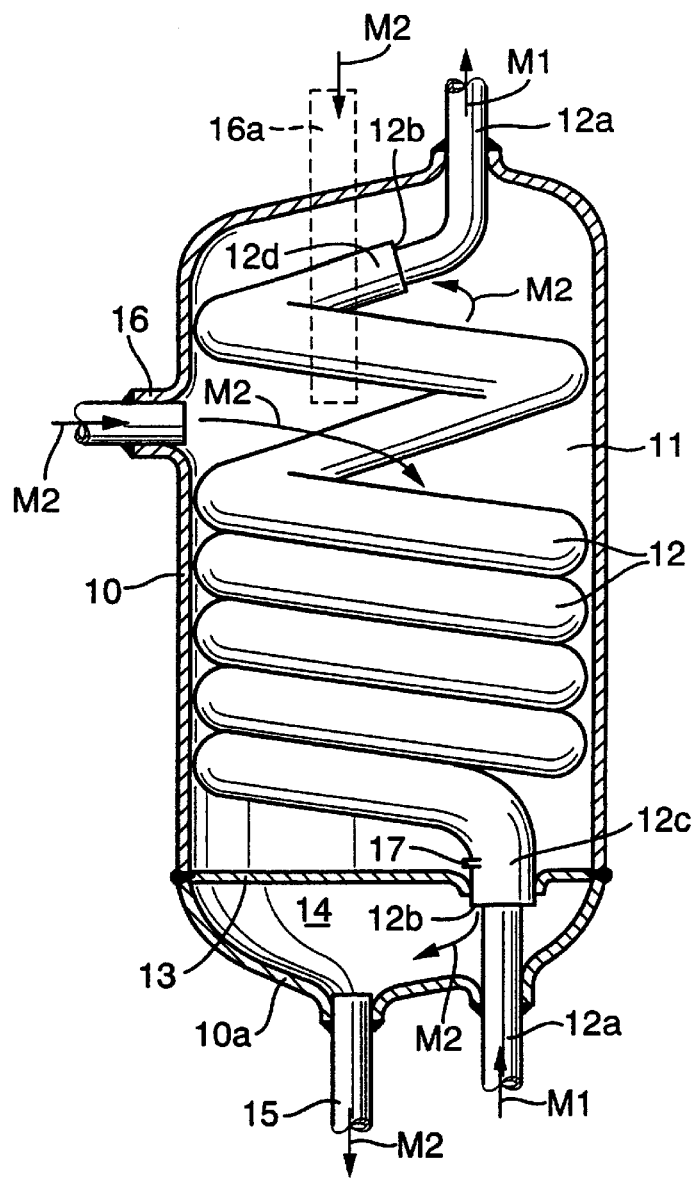
FIG. 6 is a longitudinal sectional view of an integrated modular collector—heat exchanger unit with a coaxial coiled tubing and connections on both sides, constructed according to another preferred embodiment of the present invention.

FIG. 6 illustrates an integrated modular collector—heat exchanger unit, in the case of which a collector housing 10 is provided which, while an independent collecting tank is eliminated, bounds an interior collecting space 11. In this collecting space 11, a coaxial coil tubing 12 is situated which contains a radially interior duct 12a and a radially exterior duct 12b. By means of a cutting machining on both sides, the coaxial coiled tubing 12 is shortened on its two end sections bent to form an inlet connection piece 12c and an outlet connection piece 12d in its radially exterior duct 12b such that this duct in each case still leads out inside the collector housing 10, while the radially interior duct 12a extends out of the collector housing 10 on both sides. At the lower end, the exterior coaxial tube duct 12b leads into a withdrawal space 14 which is separated from the collecting space 11 situated above by an intermediate bottom 12, which withdrawal space 14 is bounded in the downward direction by a housing bottom 19a into which an outlet connection piece 15 is inserted.

Thus, the interior coaxial tube duct 12a forms the flow duct for the first heat exchange medium M1, while the exterior coaxial tube duct 12b forms the flow duct for the second head exchange medium M2 and is in a thermal contact along a whole coiled flow course with the radially interior flow duct 12a. For this purpose, the coaxial duct is manufactured of a highly heat-conductive material. In this example, the coaxial coiled tubing 12 therefore forms the heat exchanger unit integrated into the collector housing 10, in which heat exchanger unit the two heat exchange media M1, M2 are in a heat exchange connection with one another preferably in a countercurrent, as an alternative in the co-current flow.

The second heat exchange medium M2 is introduced into the collecting space 11 by way of a lateral inlet 16. As an alternative to this lateral feeding, the second heat exchange medium M2 may also, as indicated by a broken line, be introduced into the collecting space 11 by way of an inlet connection piece 16a provided on the top side of the housing. A viscous fluid, such as a lubricating oil, which may be entrained by the second heat exchange medium M2, settles on the intermediate bottom 13. In this lower collecting space area, the coaxial tube is provided with one or several oil suction bore(s) 17, by way of which the accumulated viscous fluid can be entrained in a desired quantity by the second heat exchange medium M2 which flows in the exterior coaxial tube duct 12b and is withdrawn from the collecting space 11. In this case, the second heat exchange medium M2, preferably in a vapor state or a gaseous state, in the upper collecting space area, is sucked into the exterior coaxial tube duct 12b and leaves the latter at its opposite lower end, from where it then arrives in the withdrawal 14 and from there leaves the collector housing 10.

The modular collector—heat exchanger unit of FIG. 6 can analogously be used with the same characteristics and advantages, for example, for a motor vehicle air conditioner, as indicated concerning the above-described examples of FIGS. 1 to 5.

Figure 7:
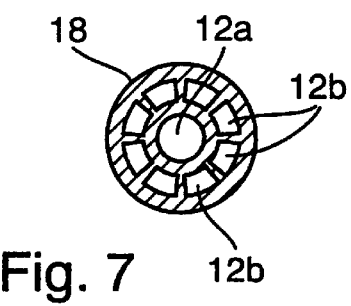
FIGS. 7 to 9 are cross-sectional views of different coaxial coiled tubings which can be used in the modular unit of FIG. 6.
Figure 8:
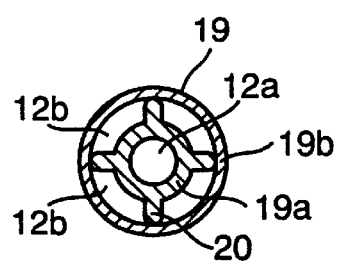
Figure 9:
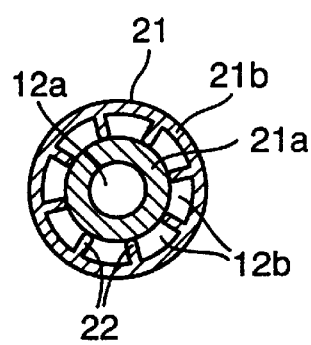

FIGS. 7 to 9 are cross-sectional views of possible structural shapes of the coaxial tube of FIG. 6. Specifically FIG. 7 shows a coaxial tube 18 which is manufactured in a completely extruded manner and has a one-piece interior duct 12a and an exterior duct 12b consisting of several parallel duct branches which are spaced in the circumferential direction.

FIG. 8 shows a coaxial tube 19 which is manufactured in two parts of a thick-walled high-pressure tube 19a and a thin-walled jacket tube 19b. The high-pressure tube 19a contains the interior duct 12a and is provided on the exterior side with spacing ribs 20 which preferably rest in a fluid-tight manner against the interior surface of the jacket tube 19b so that an exterior duct 12b is formed which, in turn, consists of several parallel branches.

The coaxial tube 21 illustrated in FIG. 9 consists of a thin-walled jacket tube 21b which is provided on the inside with axially extending spacing webs 22 and of an interior high-pressure tube 21 which forms the interior flow duct 12a. The spacing webs 22 preferably rest in a fluid-tight manner against the high-pressure tube 21a, so that several parallel duct branches are formed again which form the exterior flow duct 12b.

Whereas, in the case of the coaxial tube 18 of FIG. 7, the two-sided shortening of the exterior duct 12b with respect to the interior duct 12a, as mentioned above, may take place by means of cutting machining, this can be implemented in the case of the coaxial tubes 19, 21 of FIGS. 8 and 9, as an alternative, in that an exterior jacket tube is used which is correspondingly shorter than the interior high-pressure tube.

Figure 10:
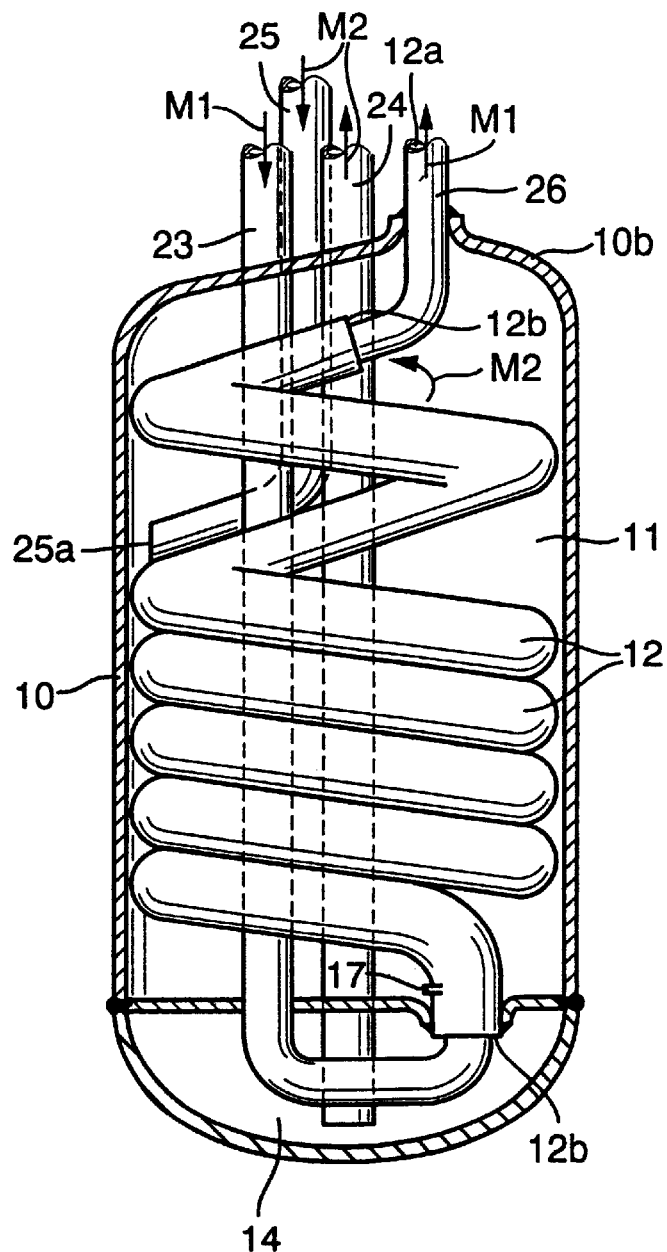
FIG. 10 is a sectional view corresponding to FIG. 6 but for a modular unit with only one connection side, constructed according to another preferred embodiment of the present invention.

FIG. 10 illustrates a variant of the modular unit of FIG. 6, in which case functionally identical elements are again provided with the same reference numbers and to this extent reference is made to the description of FIG. 6. In the case of the integrated modular collector—heat exchanger unit of FIG. 10, characteristically all four inlet and outlet connection pieces for leading the two heat exchange media M1, M2 into and out of the collector housing 10 are jointly provided on its top side 10b. As a modification of the design of FIG. 6, the interior coaxial tube duct 12a is bent in this case at its lower end in the withdrawal space 14 and is guided by means of a linear inlet connection piece 23 extending through the intermediate bottom 13 and the collecting space 11 to the housing top side 10b. Furthermore, a linear suction connection piece 24, which penetrates the collecting space 11 and the intermediate bottom 13 to the withdrawal space 14, is inserted into the housing top side 10b, by way of which suction connection piece 24 the second heat exchange medium M2, which arrives from the collecting space 11 and through the coiled exterior coaxial tube duct 12b in the withdrawal space 14, is withdrawn upward through the collector housing 10.

The feeding of the second heat exchange medium M2 to the collecting space 11 takes place by way of an inlet connection piece 25 which is also inserted into the housing top side 10*b* and which, on the collecting space side, ends with a tangential curvature 25*a*. The resulting tangential feeding of the second heat exchange medium M2, for example, of low-pressure-side refrigerant of an air conditioner, into the collecting space 11 is found to be advantageous because the resulting rotating flow leads, for example, to a desired separation of the refrigerant and the entrained oil because of their different densities. The modular unit of FIG. 10 is particularly suitable for applications in which it is desirable or required to be able to access all connections of the integrated modular collector—heat exchanger unit from one side.

Figure 11:
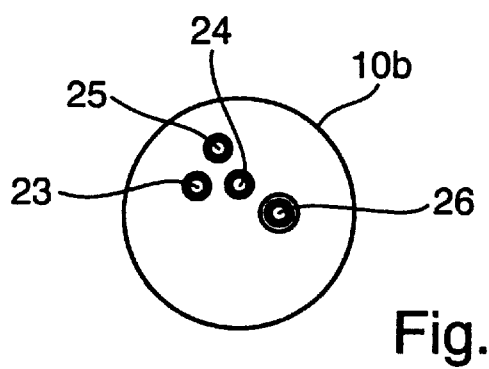
FIG. 11 is a schematic top view of the connection side of the modular unit of FIG. 10.

FIG. 11 is a top side of the common connection side of the modular unit of FIG. 10 with the inlet connection piece 23 and the outlet connection piece 26 for the first heat exchange medium M1 as well as the inlet connection piece 25 and the outlet connection piece 24 for the second heat exchange medium M2. In addition, the characteristics and advantages indicated with respect to the above embodiments correspondingly apply to this modular unit.

Figure 12:
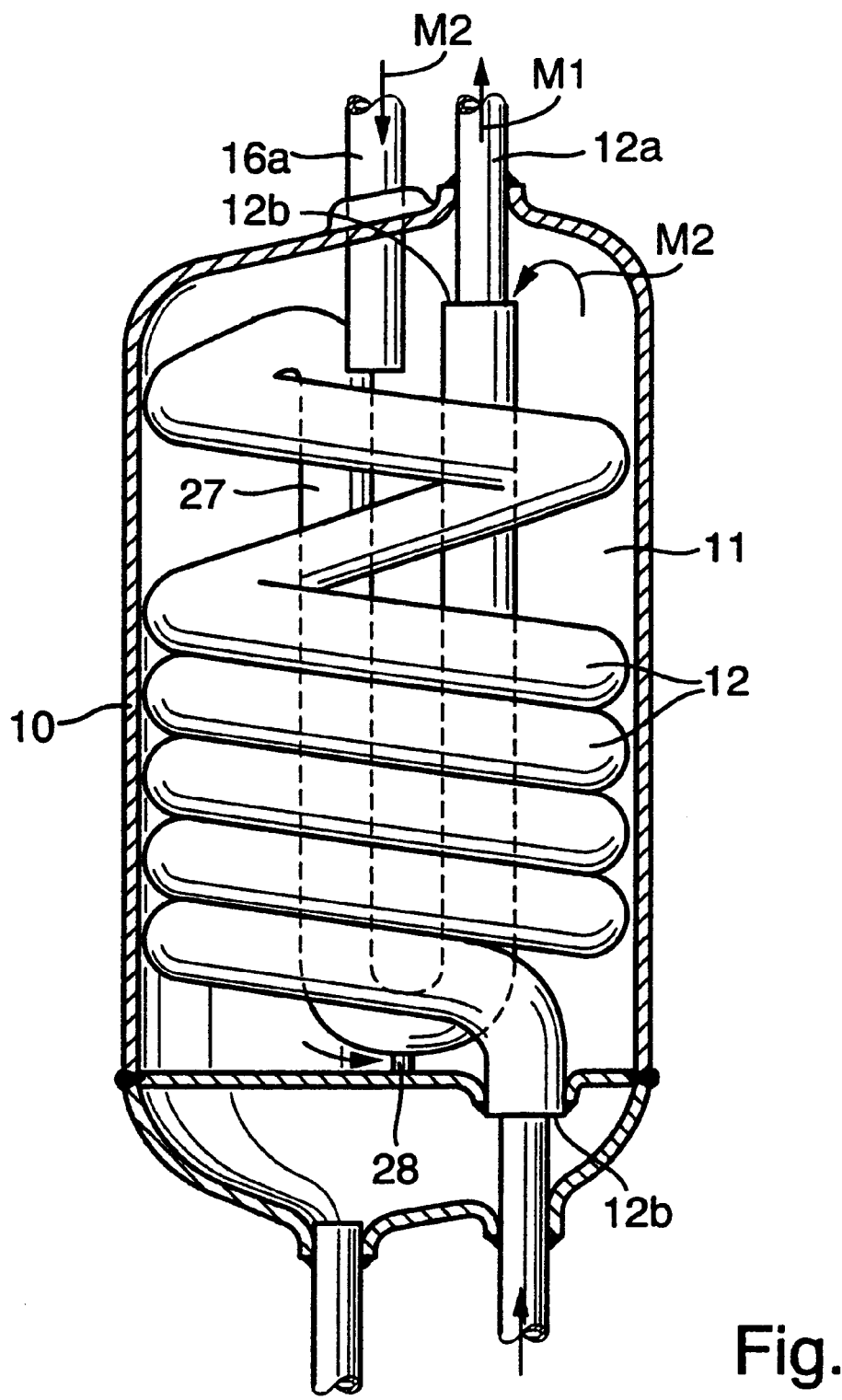
FIG. 12 is a sectional view corresponding to FIG. 6, but for a modular unit with a U-shaped coaxial tube section, constructed according to another preferred embodiment of the present invention.

FIG. 12 illustrates another variant of the modular unit of FIG. 6, in which case the same reference numbers are used again for functionally identical elements and reference is made to this extent to the above description of FIG. 6. As a modification of the design of FIG. 6, in the case of the integrated modular collector—heat exchanger unit of FIG. 12, the used coaxial tube adjoining its heat-exchange-active coil area 12 is bent on its upper end to form a U-shaped coaxial tube section 27 which extends back into the lower collecting space and extends from there upward again and out through the collector housing 10. At the lowest point of the U-curvature situated radially inside the coil area 12, an oil suction bore 28 is provided again which connects the lower collecting space area with the exterior coaxial tube duct 12*b*. Corresponding to its length, the U-shaped coaxial tube section 27 increases the heat-exchange-active flow length of the integrated heat exchanger unit formed by the coaxial tube.

As illustrated by the above-explained examples, the invention provides an integrated modular collector—heat exchanger unit, in the case of which, by means of a few components, in a compact construction and at low expenditures, a collector and a heat exchanger are integrated in a common modular unit. In particular, the modular unit can be manufactured by welded connections alone, without requiring additional soldered connections. The problem that excessive fluxing agent or solder chips off during the operation and results in operating disturbances, for example, in a refrigerant circulating system, therefore does not exist in this case so that the flow ducts are very clean on the inside.

The integrated modular collector—heat exchanger unit according to the invention is particularly suitable for a use in motor vehicle air conditioners, specifically also for those with the $CO_2$ refrigerant. Here, the heat exchanger unit forms an internal heat exchanger integrated in the low-pressure-side collector. The high-pressure-side refrigerant is guided in a closed manner in a tube, which is designed for a corresponding high pressure, through the collector housing so that no soldered or welded connection of the modular unit is stressed by the high-pressure-side refrigerant pressure. The collector housing is then stressed only by the low-pressure-side refrigerant pressure and can therefore be constructed with a relatively narrow wall thickness. As the result of the necessarily helical flow guidance for both heat exchange media in the heat exchanger unit, a high heat exchange capacity is obtained with the given compact construction, which heat exchange capacity can be increased in addition by guiding the two media in a countercurrent flow. By the profiling of the coiled tubing and/or of a possible collecting tank, the heat exchange capacity can be further improved. For the compact construction, it is also advantageous that essentially the whole collector housing can be utilized for the heat exchanger unit. The possibly provided intermediate bottom may be quite thin because a similar pressure exists on both sides. For this reason, the pipe piece extending through the intermediate floor must not absolutely be welded to the intermediate bottom; a mere fitting-through may be sufficient.

On the whole, the modular unit can be manufactured at a low weight. Leakages to the outside can be eliminated in a simple manner from the outside. Leakages between the high-pressure and the low-pressure side at connection points cannot occur in the collector housing, as mentioned above, as the result of the construction. Also, as demonstrated by the various above-mentioned examples, the inlet and outlet connections can be placed at virtually any desired point of the collector housing so that the conditions can easily be taken into account which exist in the respective application.

Other objects, advantages and novel features of the present invention will become apparent from the following detailed description of the invention when considered in conjunction with the accompanying drawings.

What is claimed is:

1. Integrated modular collector/heat exchanger unit, particularly for a motor vehicle air conditioner, having a collector housing in which a collecting space and a heat exchanger unit with first and second separate heat exchanger ducts in thermal contact with one another, are situated, the first heat exchanger duct having a helical course, and being part of a first flow duct, which extends from a housing inlet to a housing outlet in the collector housing, and the second heat exchanger duct being part of a second flow duct which extends between the collecting space and a housing connection, wherein the second heat exchanger duct also has a helical course and its coils are in a thermal contact with at least one adjoining coil respectively of the first heat exchanger duct.

2. Integrated modular collector—heat exchanger unit according to claim 1, wherein the collecting space is formed by a collecting tank arranged in an interior of the collector housing, wherein the first heat exchanger duct is formed by a coiled heat exchanger tubing which surrounds the collecting tank and has axially mutually spaced coils, the coiled tubing being tightly connected with the collecting tank by means of its radially interior coil surface, and, by means of its radially exterior coil surface, the coiled tubing being tightly connected with the collector housing, and wherein the second heat exchanger duct is formed by a space between the coils which is axially bounded by the spaced coiled tubing coils of the first exchange duct, said space being bounded radially toward the interior by the collecting tank and radially toward the exterior by the collector housing.

3. Integrated modular collector—heat exchanger unit according to claim 2, wherein the collecting tank is open at the top, wherein the second flow duct extends between the collecting tank area, which is open at the top, and a pertaining housing connection which is situated at a level of the lower collecting tank area or lower, and wherein the collecting tank is provided with one or several oil section bores in a lower area, which is connected with the second flow duct.

4. Integrated modular collector—heat exchanger unit according to claim 2, wherein the exterior wall of the collecting tank has a profiling which is adapted to the adjoining coiled heat exchanger tubing, by means of which profiling, the exterior wall rests flatly with substantial surface contact against the coiled tubing coils.

5. Integrated modular collector—heat exchanger unit according to claim 2, wherein the coiled heat exchanger tubing has an exterior-side surface-enlarging profiling.

6. Integrated modular collector—heat exchanger unit according to claim 3, wherein the exterior wall of the collecting tank has a profiling which is adapted to the adjoining coiled heat exchanger tubing, by means of which profiling, the exterior wall rests flatly with substantial surface contact against the coiled tubing coils.

7. Integrated modular collector—heat exchanger unit according to claim 6, wherein the coiled heat exchanger tubing (5a) has an exterior-side surface-enlarging profiling.

8. Integrated modular collector—heat exchanger unit according to claim 1, wherein the heat exchanger unit is formed by a coaxial coiled tubing, of which a radially interior duct forms one of the heat exchanger ducts and a radially exterior duct forms the other heat exchanger duct.

9. Integrated modular collector—heat exchanger unit according to claim 8, wherein the coaxial coiled tubing merges at its end area into a U-shaped coaxial tube section which is situated radially inside the coil area.

10. Integrated modular collector—heat exchanger unit according to claim 8, wherein the coaxial coiled tubing is arranged in the interior of the collecting space and its radially exterior duct forms the second heat exchanger duct and ends at one end in the upper collecting space area, while its interior duct continues on both sides to a pertaining housing inlet or housing outlet.

11. Integrated modular collector—heat exchanger unit according to claim 8, wherein the housing inlet and the housing outlet of the first flow duct are arranged on a common housing side and the first flow duct extends from the housing inlet or outlet by means of a linear tube section into the opposite housing area and merges there into the pertaining helical heat exchanger duct.

12. Integrated modular collector—heat exchanger unit according to claim 8, wherein collecting space feeding devices are provided which feed the heat exchange medium to be intermediately stored in the collecting space by means of a tangential flow component to the collecting space.

13. Integrated modular collector—heat exchanger unit according to claim 10, wherein the radially exterior duct of the coaxial coiled tubing is connected by way of one or several oil suction bore(s) with the lower collecting space area.

14. Integrated modular collector—heat exchanger unit according to claim 11, wherein the coaxial coiled tubing merges at its end area into a U-shaped coaxial tube section which is situated radially inside the coil area.

15. Integrated modular collector—heat exchanger unit according to claim 11, wherein the coaxial coiled tubing is arranged in the interior of the collecting space and its radially exterior duct forms the second heat exchanger duct and ends at one end in the upper collecting space area, while its interior duct continues on both sides to a pertaining housing inlet or housing outlet.

16. Integrated modular collector—heat exchanger unit according to claim 11, wherein collecting space feeding devices are provided which feed the heat exchange medium to be intermediately stored in the collecting space by means of a tangential flow component to the collecting space.

17. Integrated modular collector—heat exchanger unit according to claim 14, wherein the coaxial coiled tubing is arranged in the interior of the collecting space and its radially exterior duct forms the second heat exchanger duct and ends at one end in the upper collecting space area, while its interior duct continues on both sides to a pertaining housing inlet or housing outlet.

18. Integrated modular collector—heat exchanger unit according to claim 17, wherein the radially exterior duct of the coaxial coiled tubing is connected by way of one or several oil suction bore(s) with the lower collecting space area.

19. Integrated modular collector—heat exchanger unit according to claim 1, wherein the housing inlet and the housing outlet of the first flow duct are arranged on a common housing side and the first flow duct extends from the housing inlet or outlet by means of a linear tube section into the opposite housing area and merges there into the pertaining helical heat exchanger duct.

20. Integrated modular collector—heat exchanger unit according to claim 1, wherein collecting space feeding devices are provided which feed the heat exchange medium to be intermediately stored in the collecting space by means of a tangential flow component to the collecting space.

21. Integrated modular collector and heat exchanger unit for a motor vehicle air conditioner, comprising:

a collector housing forming a collector space and having a housing inlet, a housing outlet and a housing connection, and a heat exchanger unit with first and second heat exchanger ducts in the collector housing, wherein the first heat exchanger duct forms part of a first flow duct between the housing inlet and housing outlet, wherein the second heat exchanger duct is part of a second flow duct between the housing connection and the collecting space, and wherein the first and second heat exchange ducts have respective helical coils in thermal contact with one another.

22. A unit according to claim 21, wherein the helical coils of the first and second heat exchanger ducts are coaxial.

23. A unit according to claim 21, wherein the collecting space is formed by a collecting tank arranged in an interior of the collector housing, wherein the first heat exchanger duct is formed by a coiled heat exchanger tubing which surrounds the collecting tank and has axially mutually spaced coils, the coiled tubing being tightly connected with the collecting tank by means of its radially interior coil surface, and, by means of its radially exterior coil surface, the coiled tubing being tightly connected with the collector housing, and wherein the second heat exchanger duct is formed by a space between the coils which is axially bounded by the spaced coiled tubing coils of the first exchange duct, said space being bounded radially toward the interior by the collecting tank and radially toward the exterior by the collector housing.

24. A method of making an integrated collector and heat exchanger unit for a motor vehicle air conditioner, said method comprising:

providing a collector housing forming a collector space and having a housing inlet, a housing outlet and a housing connection, and disposing a heat exchanger unit with first and second heat exchanger ducts in the collector housing, wherein the first heat exchanger duct forms part of a first flow duct between the housing inlet and housing outlet, wherein the second heat exchanger duct is part of a second flow duct between the housing connection and the collecting space, and wherein the first and second heat exchange ducts have respective helical coils in thermal contact with one another.

25. A method of making an integrated collector and heat exchanger unit for a motor vehicle air conditioner according to claim 24, comprising formation of a welded connection of the collector housing and heat exchanger unit parts.

* * * * *